United States Patent [19]
Kim et al.

[11] Patent Number: 5,869,938
[45] Date of Patent: Feb. 9, 1999

[54] CURRENT CONTROL APPARATUS IN DC MOTOR

[75] Inventors: Jong Gun Kim, Changwon; Seong Chul Huh, Taegu; Ki Ryong Kwon, Kyung Nam, all of Rep. of Korea

[73] Assignee: Samsung Heavy Industries Co. Ltd, Seoul, Rep. of Korea

[21] Appl. No.: 564,759

[22] Filed: Nov. 29, 1995

[30] Foreign Application Priority Data

Mar. 30, 1995 [KR] Rep. of Korea ................... 1995 6981

[51] Int. Cl.$^6$ ...................................................... H02P 7/14
[52] U.S. Cl. ........................ 318/139; 318/245; 318/246; 388/804
[58] Field of Search ................................. 318/139, 245, 318/246, 432, 433; 388/801, 803, 804, 809, 811, 816, 819

[56] References Cited

U.S. PATENT DOCUMENTS

| | | | |
|---|---|---|---|
| 4,366,420 | 12/1982 | Omae et al. | 318/139 X |
| 4,443,744 | 4/1984 | Konrad | 318/269 |
| 5,136,219 | 8/1992 | Takahashi et al. | 318/139 |

*Primary Examiner*—Bentsu Ro
*Attorney, Agent, or Firm*—Kenyon & Kenyon

[57] ABSTRACT

Current control apparatus of DC motor includes current amplifying means for detecting the current amount at the rear end of the motor and amplifying the current value; on-off control means for comparing the input current with the current supplied from the current amplifying means and outputting an on-off control signal according to the current amount; and microcomputer for controlling the duty value of the pulse wave of a predetermined frequency occurring in accordance with the on-off control signal from the on-off control means and controlling the on-off time of the chopper transistor.

4 Claims, 4 Drawing Sheets

CURRENT CONTROL APPARATUS IN DC MOTOR

BACKGROUND OF THE INVENTION

1. Field of the Invention

The present invention relates in general to a current control apparatus used in direct current (DC) motors and more particularly to a current control apparatus in which the driving state of the motor in battery driven electric vehicles is controlled by the current value.

2. Description of the Prior Art

Generally, battery driven apparatus such as electric forklifts, small electric cars, oil pressure device and swelling pumps use DC motors and DC motor controllers. These types of DC motors usually use a voltage control method.

FIG. 1 shows a pair of filtering condensers 2 and 3 for filtering the power from the battery 1, a motor field coil 4 and a motor armature 5 driven by the battery, a chopper transistor 6 for switching the battery power to motor field coil 4 and motor armature 5, a pair of forward and backward contactors 7 and 8 for controlling the polarity of the motor field coil 4, regeneration excitation circuit 9 for returning the energy generated by the motor system to the battery 1, regeneration excitation contactor 10 for switching the regeneration excitation circuit 9, and a microcomputer 11 for controlling the above.

Operations of the power circuit of DC motor will be described in detail hereinbelow.

Power from the battery 1 is filtered by the filtering condensers 2 and 3 and applied to the chopper transistor 6. The chopper transistor 6 performs switching operation of the battery power which is on-off controlled by the control signal of the microcomputer 11 to the motor field 4 and motor armature 5. The battery power is supplied to the motor field coil 4 and the motor armature 5 and then the motor begins to drive.

The battery 1 is charged by turning off the regeneration excitation circuit and regenerated when energy from the motor is supplied to the battery 1 through the regeneration diode 12. Thus the motor system loses kinetic energy and brakes.

However, there is a problem that the power circuit of DC motor is not efficiently controlled because the power circuit of the DC motor is made to control the input power required for driving the motor, the capacity of the filtering condenser on the input end is limited, and as a result, the input voltage cannot be increased above the predetermined value.

Also, there is another problem in that if the motor is used for a long time, the internal resistance of the motor will change depending on the temperature, and the inductance value in the motor will change, thereby causing an unstable current control.

SUMMARY OF THE INVENTION

The object of the present invention is to control the amount of the current supplied to the DC motor and the driving state of the DC motor, providing the current control apparatus for DC motors enabling direct control, high efficiency and safe circuit.

In order to achieve the object, the present invention provides a current control apparatus having motor field coil and motor armature and driven by the power of a battery, and a chopper transistor for controlling the amount of the current supplied to the DC motor from the battery, comprising current amplifying means for detecting the current amount at the rear end of the motor and amplifying the current value; on-off control means for comparing the input current with the current supplied from the current amplifying means and outputting an on-off control signal according to the current amount; and a microcomputer for controlling the duty value of the pulse wave of a predetermined frequency occurring in accordance with the on-off control signal from the on-off control means and controlling the on-off time of the chopper transistor.

The microcomputer performs the following steps: a step for determining whether or not an interrupt counter is an initial state, setting an initial state if yes and setting the outputting pulse limiting value of the microcomputer; a step for determining whether or not the duty value of the microcomputer output pulse is 0 in case of non-initial state of the interrupt counter; and a step for comparing the state in the chopper transistor. feedback current signal with the current value to control the on-off

DETAILED DESCRIPTION OF THE PREFERRED EMBODIMENT

Figure 2:
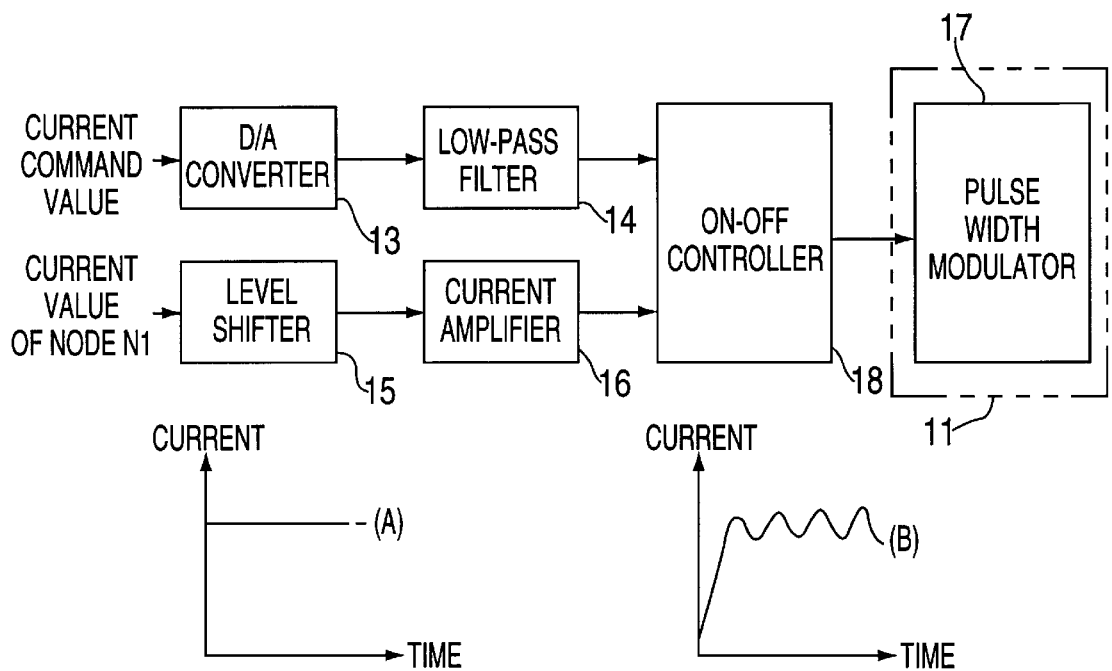
FIG. 2. is a schematic block diagram of the current control apparatus of direct current motor in accordance with the present invention.

FIG. 2 is a schematic block diagram for the current control apparatus of the DC motor of the present invention. FIG. 2 shows a digital/analog (D/A) converter 13, low-pass filter 14, level shifter 15, current amplifier 16, on-off controller 18 and pulse width modulator 17.

The digital/analog converter 13 converts the digital-type current from the microcomputer 11 to the analog-type current. The low-pass filter 14 filters the low band to eliminate the ripple elements in the analog current converted by the D/A converter 13. The level shifter 15 shifts the level of the feedback current to the size which can be compared with the reference level. The current amplifier 16 amplifies the feedback current shifted by the level shifter 15. The on-off controller 18 compares the current value from the low pass filter 14 with the feedback current value from the current amplifier 16 and controls the pulse duty value of the pulse width modulator 17 in the microcomputer 11. The pulse width modulator 17 controls the driving state of the motor by changing the duty value in the pulse signal according to the control signal of the on-off controller 18.

Figure 3:
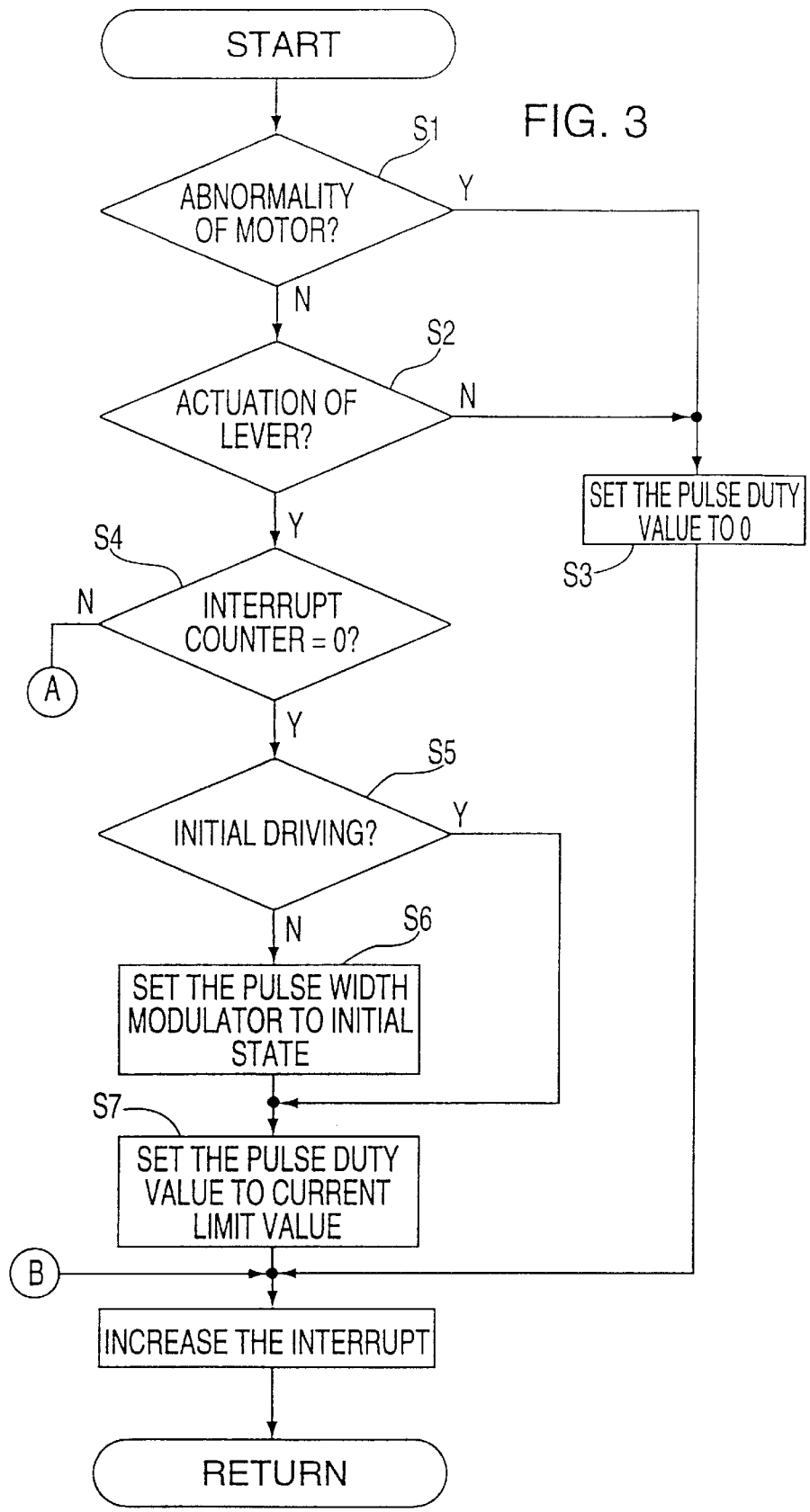
FIGS. 3 and 3A are a flow chart of the present invention.
Figure 3A:
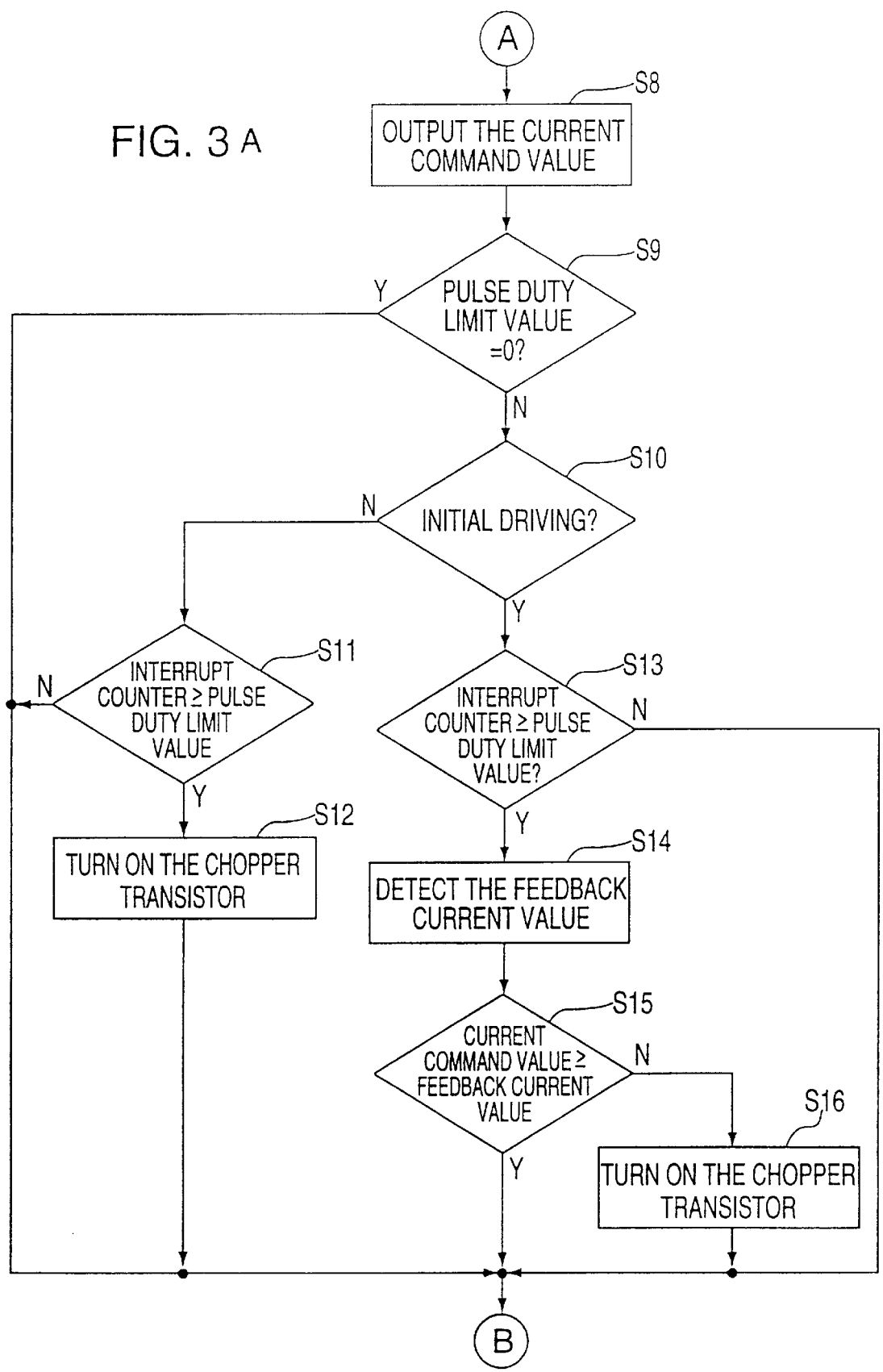

FIGS. 3 and 3A show the operation of the present invention.

Figure 1:
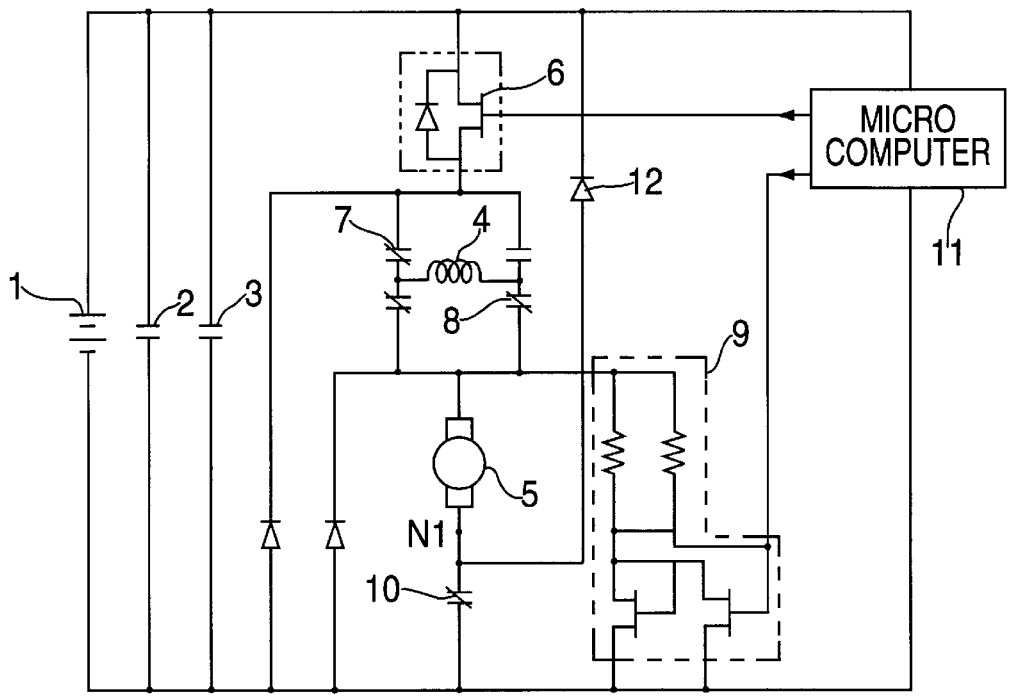
FIG. 1. is a circuit diagram of the conventional direct current motor controller.

The microcomputer 11 checks whether the abnormality of the power circuit as shown in FIG. 1 (S1), and, if the state is determined as normal, the microcomputer 11 checks the lever is actuated by the operator (S2).

If steps S1 and S2 prove the abnormality, or that the lever is not actuated, the microcomputer 11 sets the duty limit value of the output pulse in the pulse width modulator 17 as 0. In this case, the chopper transistor 6 switches off because the pulse output from the pulse width modulator 17 is maintained "low". (S3)

Figure 4:
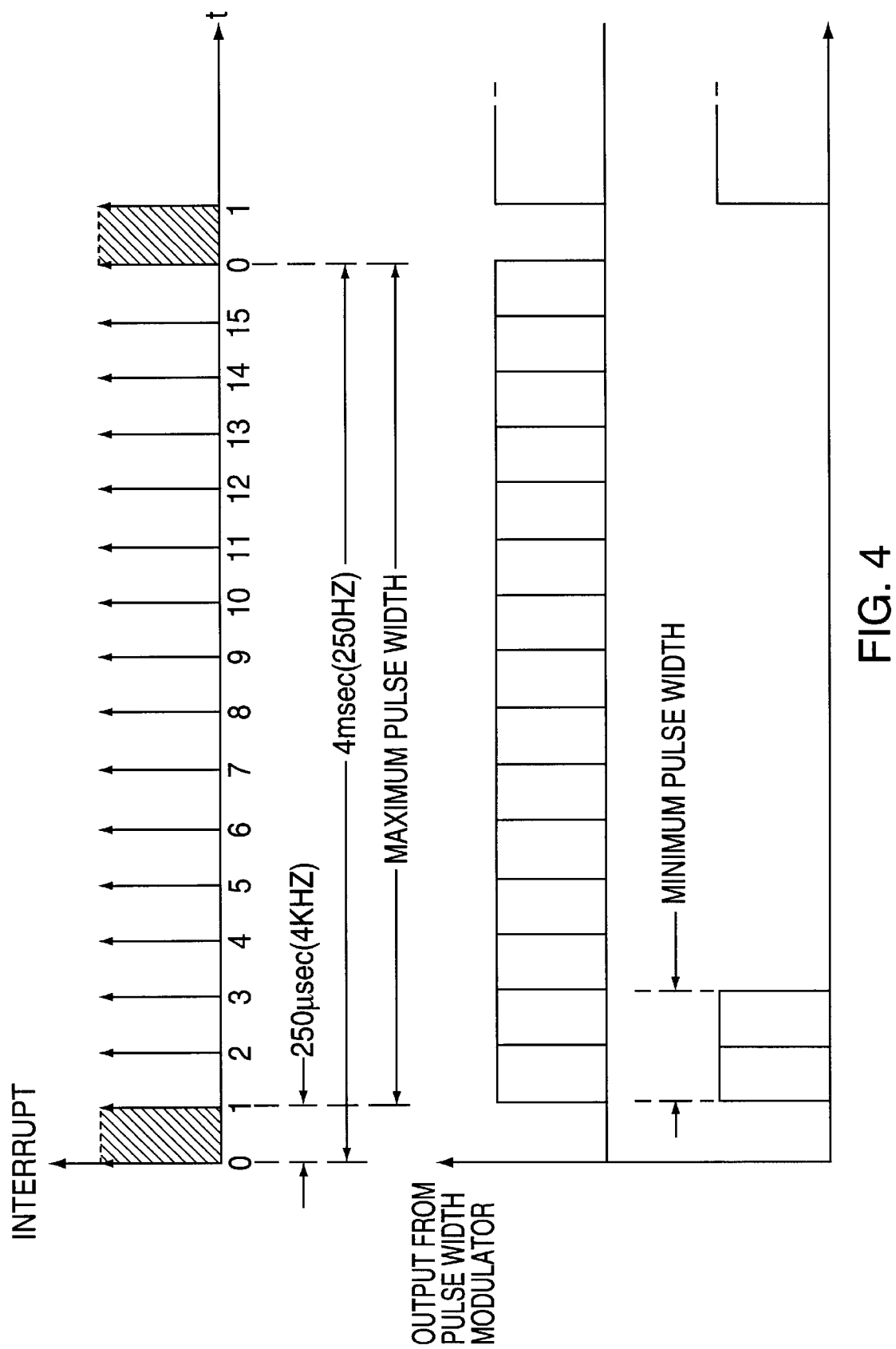
FIG. 4. is an output wave form of the pulse width modulator by the present invention.

If the lever is actuated in S2, the microcomputer 11 checks whether or not the interrupt counter in the pulse width modulator 17 is 0 (S4). Herein, the pulse output from the pulse width modulator is divided into 16 interrupts as shown in FIG. 4 and can have the pulse duty 1 to 15 among each divided interrupt. If the interrupt counter is 0 in S4, the microcomputer 11 checks the initial driving state (S5). If it is not in the initial state, the microcomputer 11 sets the pulse width modulator 17 to the initial state (S6) and the value of the pulse duty to the current limit value (S7). If it is in the initial driving state, the step goes to S7 without passing through S6.

If the interrupt counter is not 0 in S4, the microcomputer 11 outputs the current value to the D/A converter 13 (S8) and checks if the limit value of the pulse duty is 0 (S9). In S9, if the pulse limit value is not 0, the microcomputer 11 determines the initial driving state (S10).

If it is not in the initial state in S10, the microcomputer 11 determines if the interrupt counter is above the value of the pulse duty limit (S1), and if the interrupt counter is above the value of the pulse duty limit, the output pulse of the pulse width modulator 17 is converted "high" and the chopper transistor 6 is turned on (S12). If the interrupt counter is not above the value of the pulse duty limit, the microcomputer 11 does not perform step S12.

If it is determined to be in the initial driving state in S10, the microcomputer 11 checks whether or not the interrupt counter is above the pulse duty limit value (S13). If the interrupt counter is above the value, the microcomputer 11 detects the feedback current value from N1 (S14). The feedback current value detected at N1 is amplified to a predetermined level by the level shifter 15 after being amplified to a certain size by the current amplifier 16. The feedback current amplified by the current amplifier 16 is input to the on-off controller 18. The on-off controller 18 compares the command value of the current from the low-pass filter 14 with the feedback current value from the current amplifier 16 and outputs the data to the microcomputer 11. The microcomputer 11 determines whether or not the current command value is above the value of the feedback current (S15). If not, the microcomputer 11 converts the pulse output from the pulse width modulator 17 to "high" and turns on the chopper transistor 6.

The step of S17 to increase the interrupt is carried out in the following cases: after the steps of S3, S7, S12 and S16 are performed or when the limited value of the pulse duty is 0 in S9, or the interrupt counter is not above the limit value of the pulse duty in S11 and S13 or the current command value of the current is not above the value of the feedback current.

The on-off state of the chopper transistor is controlled by increasing the interrupt through repeating said steps to control the output pulse duty value of the pulse width modulator 17, thereby controlling the current amount provided to the motor system through the chopper transistor 6.

As explained above, the current control apparatus of the present invention has advantages of the direct control by controlling the amount of current regardless of the capacity of the filtering condenser in the input end.

It has another advantage of a safe current control due to the stable current amount even during long use of the motor system.

Further, the present invention enhances the reliability of the circuit since the over-current is prevented in the power circuit.

What is claimed is:

1. A current control apparatus for a system having a DC motor including motor field coil and motor armature and driven by the power of a battery, and a chopper transistor for controlling the amount of current supplied to the DC motor from the battery, said apparatus comprising:

a current amplifier for detecting a feedback current value at the rear end of the motor and amplifying the feedback current value;

an on-off controller for comparing an input command current value with the amplified feedback current value supplied from the current amplifier and outputting an on-off control signal as a function of the comparison; and a microcomputer for controlling the duty value of an output pulse wave of a predetermined frequency occurring in accordance with the on-off control signal from the on-off controller, said microcomputer having:

a pulse-width modulator for generating said output pulse wave, said modulator having an interrupt counter for counting a plurality of state values;

means for determining whether said interrupt counter is in an initial state; and means for setting the interrupt counter in the initial state and establishing a pulse-duty limit value of said output pulse wave from said pulse-width modulator;

wherein said duty value of said output pulse wave controls the on-off time of the chopper transistor.

2. The current control apparatus according to claim 1, wherein said microcomputer further comprises:

means for determining, when the interrupt counter is not in the initial state, whether the pulse-duty limit value of the output pulse wave of said pulse-width modulator is 0; and means for comparing the state value of the interrupt counter with the pulse-duty limit value of the output pulse wave.

3. A method of controlling, by means of a microcomputer and a current control apparatus having an ON-OFF controller, a current supplied to a DC motor from a power source, said DC motor having a motor field coil, a motor armature, and a chopper transistor for controlling the amount of current supplied to the DC motor from the power source, said microcomputer having a pulse-width modulator with an interrupt counter, which method comprises:

detecting a feedback current value at the rear end of the motor and amplifying the feedback current value;

comparing in the ON-OFF controller an input command current value with the amplified feedback current value and outputting an ON-OFF control signal as a function of the comparison;

controlling in the microcomputer the duty value of an output pulse generated as a function of the ON-OFF control signal; and controlling the on-off time of the chopper transistor as a function of the duty value of said output pulse;

wherein said step of controlling the duty value of the output pulse comprises the substeps of:

determining whether said interrupt counter is in an initial state;

if the interrupt counter is not in the initial state, determining whether the pulse duty limit value is 0; and if the pulse duty limit value is not 0, comparing the interrupt count of the interrupt counter with the pulse duty limit value.

4. The method according to claim 3, wherein said step of controlling the duty value of the output pulse further comprises the substeps of:

if the interrupt count of the interrupt counter is at least equal to the pulse duty limit value, performing one of the steps of putting the pulse output from the pulse-width modulator high, if the motor is in initial driving state, and checking the state of the ON-OFF control signal, if the motor is not in initial driving state; and if the ON-OFF control signal indicates that the input command current value is less than the amplified feedback current value, putting the pulse output from the pulse width modulator high.

* * * * *